United States Patent
Hyoki

(10) Patent No.: US 8,755,701 B2
(45) Date of Patent: Jun. 17, 2014

(54) IMAGE SCANNER, IMAGE FORMING APPARATUS AND IMAGE ADJUSTING METHOD OF IMAGE SCANNER

(75) Inventor: Kenji Hyoki, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 258 days.

(21) Appl. No.: 12/987,470

(22) Filed: Jan. 10, 2011

(65) Prior Publication Data

US 2012/0070200 A1    Mar. 22, 2012

(30) Foreign Application Priority Data

Sep. 21, 2010   (JP) ................................ 2010-210412

(51) Int. Cl.
  *G03G 15/043* (2006.01)
  *G03G 15/00* (2006.01)
  *H04N 1/12* (2006.01)

(52) U.S. Cl.
  CPC ............ *G03G 15/5062* (2013.01); *H04N 1/125* (2013.01)
  USPC ........................................................... 399/51

(58) Field of Classification Search
  CPC .......... G03G 15/5062; H04N 1/00045; H04N 1/00063; H04N 1/00087
  USPC .................................... 399/51, 297; 358/443
  See application file for complete search history.

(56) References Cited

U.S. PATENT DOCUMENTS

| | | | | |
|---|---|---|---|---|
| 5,159,230 A | * | 10/1992 | Pais | 313/32 |
| 5,821,917 A | * | 10/1998 | Cappels | 345/589 |
| 6,351,308 B1 | * | 2/2002 | Mestha | 356/402 |
| 6,560,357 B1 | | 5/2003 | Yamazaki | |
| 6,830,706 B2 | * | 12/2004 | Ravilisetty | 252/301.4 R |
| 2001/0033395 A1 | * | 10/2001 | Chizawa | 358/461 |
| 2002/0122209 A1 | * | 9/2002 | Yoshida | 358/2.1 |
| 2004/0042807 A1 | * | 3/2004 | Nakayama | 399/49 |
| 2005/0244177 A1 | * | 11/2005 | Iwakawa | 399/49 |
| 2007/0025779 A1 | * | 2/2007 | Shinohara | 399/301 |
| 2008/0013828 A1 | * | 1/2008 | Pearson et al. | 382/167 |
| 2008/0056737 A1 | * | 3/2008 | Flemming et al. | 399/15 |
| 2009/0161111 A1 | * | 6/2009 | Ossman et al. | 356/446 |
| 2011/0080626 A1 | * | 4/2011 | Morikawa | 358/509 |

FOREIGN PATENT DOCUMENTS

| | | |
|---|---|---|
| JP | A 2000-059637 | 2/2000 |
| JP | A-2001-218072 | 8/2001 |
| JP | A 2006-229351 | 8/2006 |
| JP | 2010114498 A * | 5/2010 |

OTHER PUBLICATIONS

English-language translation of Korean Office Action dated Mar. 5, 2014 from Korean Patent Application No. 10-2011-0013177.

* cited by examiner

*Primary Examiner* — David Gray
*Assistant Examiner* — Tyler Hardman
(74) *Attorney, Agent, or Firm* — Oliff PLC

(57) ABSTRACT

An image scanner includes: a light source that irradiates, with light, a recording medium on which an image is formed; a light receiving portion that receives light reflected by the recording medium; a generating portion that generates a light amount value from the light received by the light receiving portion; a measuring portion in which plural reflecting surfaces are disposed, the reflecting surfaces respectively having predetermined colors different from each other; and a processing portion that derives a correlation formula from a light amount value generated at predetermined reference time and from a light amount value generated when the reflecting surfaces in the measuring portion are irradiated with the light from the light source, the correlation formula expressing a time-varying change in the light source.

10 Claims, 14 Drawing Sheets

IMAGE SCANNER, IMAGE FORMING APPARATUS AND IMAGE ADJUSTING METHOD OF IMAGE SCANNER

CROSS REFERENCE TO RELATED APPLICATIONS

This application is based on and claims priority under 35 USC §119 from Japanese Patent Application No. 2010-210412 filed Sep. 21, 2010.

BACKGROUND

1. Technical Field

The present invention relates to an image scanner, an image forming apparatus and an image adjusting method of an image scanner.

2. Related Art

An image scanner scanning image information of a sheet on which an image is formed has conventionally been used as a scanner or the like for input to a copy machine, a facsimile or a computer. Such an image scanner causes a light source disposed at a transport path of a sheet to irradiate the sheet with light, causes an image sensor to receive reflected light reflected from the sheet, and thereby scans an image on the sheet.

SUMMARY

According to an aspect of the present invention, there is provided an image scanner including: a light source that irradiates, with light, a recording medium on which an image is formed; a light receiving portion that receives light reflected by the recording medium; a generating portion that generates a light amount value from the light received by the light receiving portion; a measuring portion in which plural reflecting surfaces are disposed, the reflecting surfaces respectively having predetermined colors different from each other; and a processing portion that derives a correlation formula from a light amount value generated at predetermined reference time and from a light amount value generated when the reflecting surfaces of the measuring portion are irradiated with the light from the light source, the correlation formula expressing a time-varying change in the light source.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail with reference to the attached drawings.

<Description of Image Forming Apparatus>

Figure 1:
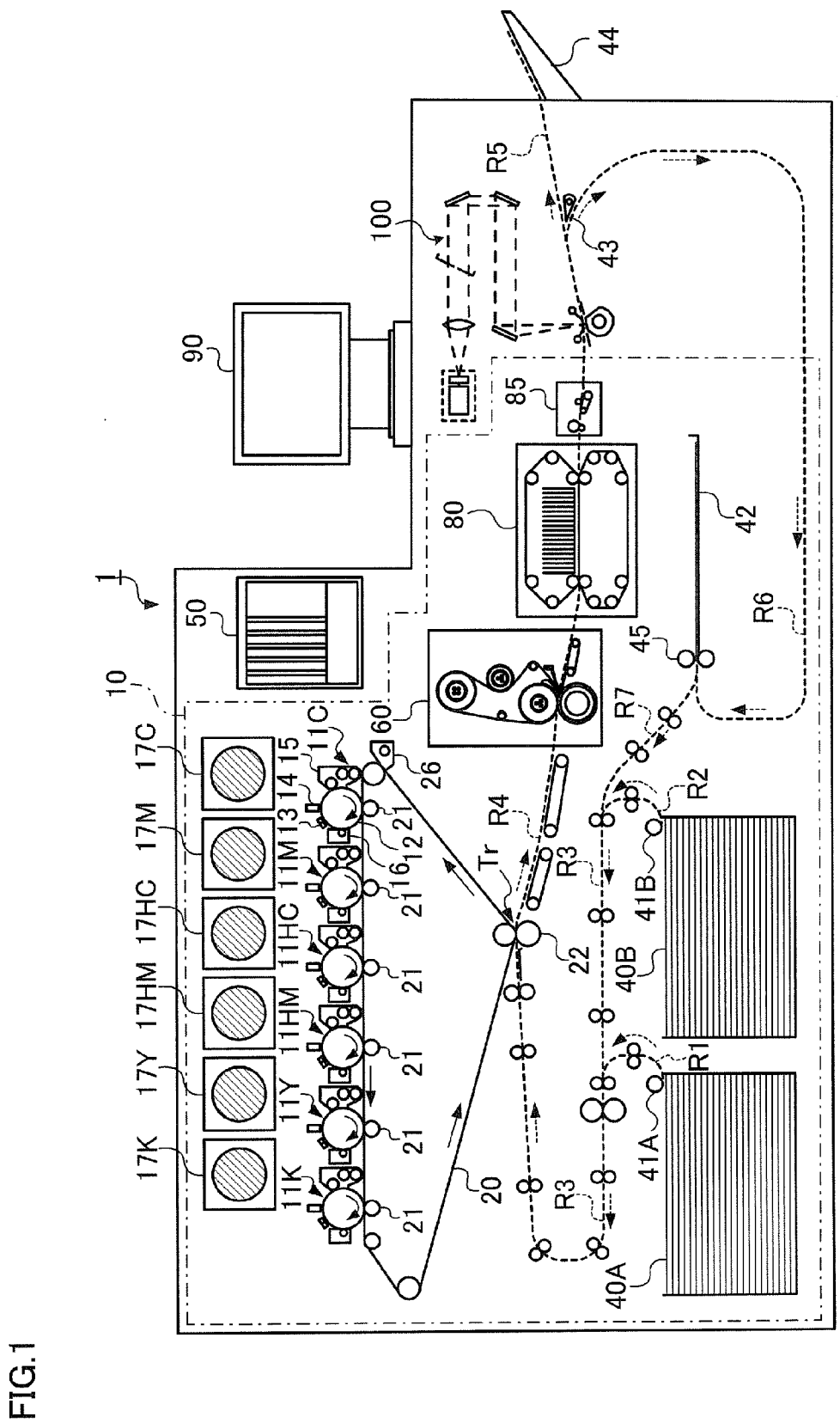
FIG. 1 is a diagram illustrating an image forming apparatus to which an image scanner according to an exemplary embodiment is applied.

FIG. 1 is a diagram illustrating an image forming apparatus 1 to which an image scanner 100 according to the present exemplary embodiment is applied.

The image forming apparatus 1 is a so-called "tandem-type" color printer, and includes: an image forming portion 10 that forms an image on a sheet serving as an example of a recording medium, on the basis of image data; a main controller 50 that controls operations of the entire image forming apparatus 1, performs communications with a personal computer (PC) or the like, for example, and performs image processing and the like on image data; a user interface (UI) portion 90 that receives an input operation made by a user and displays various information for a user; and the image scanner 100 as an example of a scanner unit that scans an image on a sheet in order to adjust an image to be formed on the sheet by the image forming portion 10.

<Description of Image Forming Portion>

The image forming portion 10 is a functional portion that forms an image by an electrophotographic system, for example, and includes: six image forming units 11C, 11M, 11HC, 11HM, 11Y and 11K (hereinafter, referred to as "image forming units 11" collectively) as an example of a toner image forming unit that are arranged in parallel; an intermediate transfer belt 20 onto which color toner images respectively formed on photoconductive drums 12 of the respective image forming units 11 are transferred; and primary transfer rolls 21 that transfer (primarily transfer), onto the intermediate transfer belt 20, the color toner images formed by the respective image forming units 11. The image forming portion 10 further includes: a secondary transfer roll 22 that collectively transfers (secondarily transfers), onto a sheet, the color toner images transferred on the intermediate transfer belt 20 in a superimposing manner; and a fixing unit 60 as an example of a fixing unit (a fixing device) that fixes the secondarily transferred color toner images on the sheet. Hereinafter, a region in which the secondary transfer roll 22 is disposed to secondarily transfer, onto the sheet, the color toner images on the intermediate transfer belt 20 will be referred to as "secondary transfer region Tr."

Additionally, the image forming portion 10 includes: a cooling unit 80 as an example of a cooling portion that cools the color toner images fixed on the sheet by the fixing unit 60 so as to facilitate fixation of the color toner images on the sheet; and a curl correcting unit 85 that corrects curl of the sheet. In the image forming apparatus 1 of the present exemplary embodiment, the intermediate transfer belt 20, the primary transfer rolls 21 and the secondary transfer roll 22 constitute a transfer unit that transfers a toner image onto a sheet.

<Description of Image Forming Unit>

As functional members, each of the image forming units 11 includes, for example: the photoconductive drum 12 on which an electrostatic latent image is formed and thereafter each color toner image is formed; a charging device 13 that charges the surface of the photoconductive drum 12 at a predetermined electric potential; an exposure device 14 that exposes, on the basis of image data, the photoconductive drum 12 charged by the charging device 13; a developing device 15 that develops the electrostatic latent image formed on the photoconductive drum 12 by using a toner of each color; and a cleaner 16 that cleans the surface of the photoconductive drum 12 after transfer.

The developing devices 15 of the respective image forming units 11 are respectively connected through toner transport paths (not shown) to toner containers 17C, 17M, 17HC, 17HM, 17Y and 17K (hereinafter, referred to as "toner containers 17" collectively) that store the respective color toners. The developing devices 15 are configured to be refilled with the respective color toners from the toner containers 17 through refill screws (not shown) provided in the toner transport paths.

The image forming units 11 have substantially similar configurations except for toners housed in the respective developing devices 15, and form toner images of the respective colors of cyan (C), magenta (M), high lightness cyan (HC), high lightness magenta (HM), yellow (Y) and black (K). Here, HC has a hue of cyan, and has a lighter color tone. HM has a hue of magenta, and has a lighter color tone.

<Description of Fixing Unit>

Figure 2:
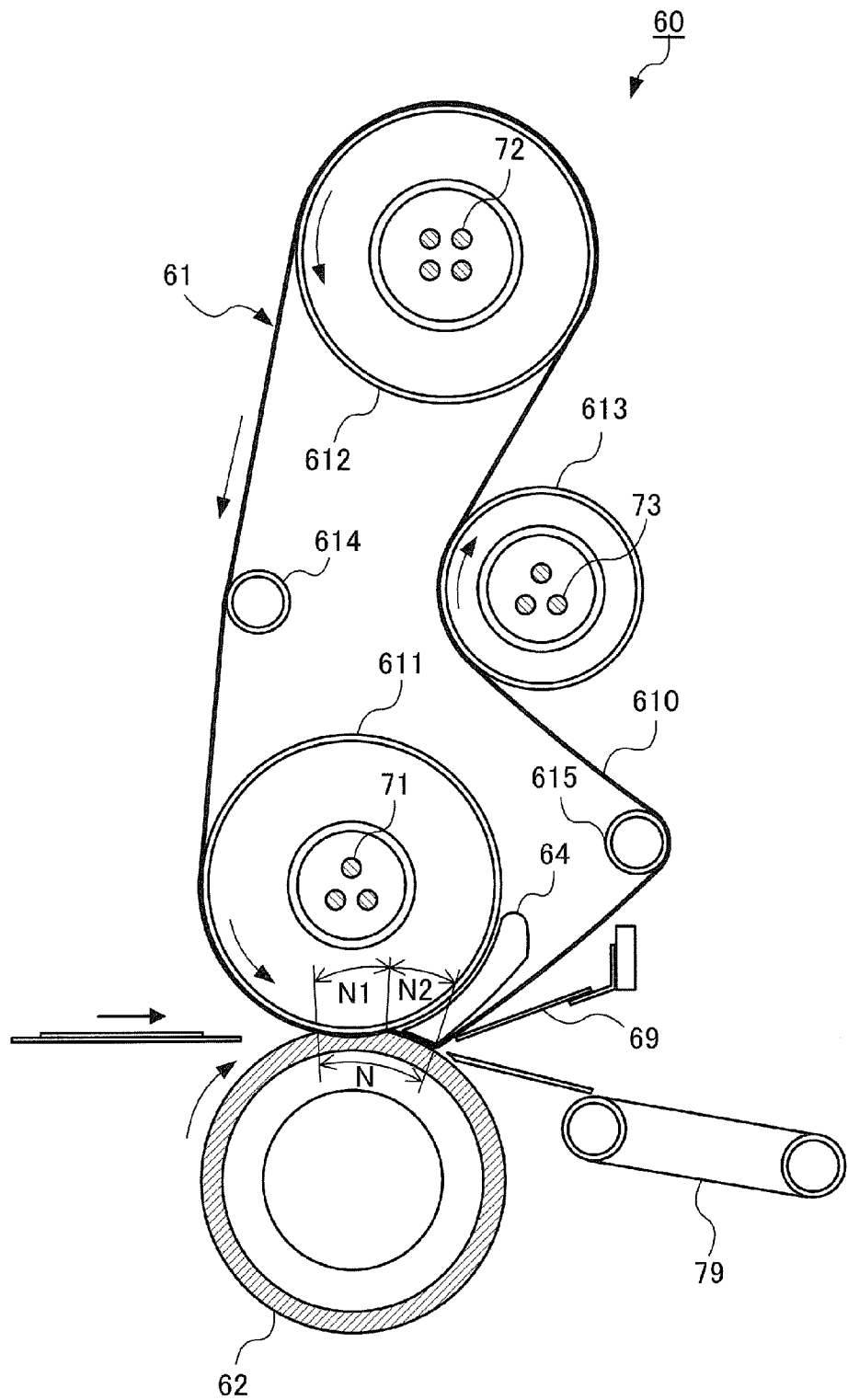
FIG. 2 is a cross-sectional configuration diagram for illustrating a configuration of the fixing unit.

FIG. 2 is a cross-sectional configuration diagram for illustrating a configuration of the fixing unit 60.

The main part of the fixing unit 60 is composed of: a fixing belt module 61 heating a sheet; and a pressure roll 62 configured in such a way that the pressure roll 62 may be contactable with and separable from the fixing belt module 61.

The fixing belt module 61 includes: a fixing belt 610; a fixing roll 611 that rotates while tensioning the fixing belt 610 and heats the fixing belt 610 from the inner side thereof at a nip portion N which is a region where the fixing belt module 61 and the pressure roll 62 are in pressure contact with each other (in contact with each other while pressing each other); an inner heating roll 612 that heats the fixing belt 610 while tensioning the fixing belt 610 from the inner side thereof; and an outer heating roll 613 that heats the fixing belt 610 while tensioning the fixing belt 610 from the outer side thereof. Additionally, the fixing belt module 61 includes: a tension roll 614 that tensions the fixing belt 610 between the fixing roll 611 and the inner heating roll 612 (on the upstream side of the nip portion N in a belt movement direction); a peeling pad 64 that is disposed at a region on the downstream side in the nip portion N and at a position in the vicinity of the fixing roll 611; and a tension roll 615 that tensions the fixing belt 610 on the downstream side of the nip portion N. The fixing roll 611, the inner heating roll 612 and the outer heating roll 613 respectively have a halogen heater 71, a halogen heater 72 and a halogen heater 73 placed inside thereof as heat sources.

<Description of Sheet Transporting System in Image Forming Apparatus>

As a sheet transporting system, the image forming portion 10 additionally includes: plural (two in the present exemplary embodiment) sheet containers 40A and 40B that house sheets therein; feed rolls 41A and 41B that feed and transport sheets housed in the sheet containers 40A and 40B; a first transport path R1 that is used for transporting a sheet fed from the sheet container 40A; and a second transport path R2 that is used for transporting a sheet fed from the sheet container 40B. The image forming portion 10 further includes a third transport path R3 that is used for transporting the sheet fed from the sheet container 40A or 40B toward the secondary transfer region Tr. Additionally, the image forming portion 10 includes: a fourth transport path R4 that is used for transporting the sheet, on which the color toner images are transferred in the secondary transfer region Tr, so as to cause the sheet to pass through the fixing unit 60, the cooling unit 80, the curl correcting unit 85 and the image scanner 100; and a fifth transport path R5 that is used for transporting the sheet from the image scanner 100 toward a sheet stacking portion 44 provided for an output portion of the image forming apparatus 1.

Transfer rolls or transfer belts are arranged on each of the first to fifth transport paths R1 to R5 to sequentially transport sheets fed on the corresponding path.

<Description of Duplex Transporting System>

As a duplex transporting system, the image forming portion 10 additionally includes: an intermediate sheet container 42 that once holds a sheet on a first surface of which the color toner images are fixed by the fixing unit 60; a sixth transport path R6 that is used for transporting a sheet from the image scanner 100 toward the intermediate sheet container 42; and a seventh transport path R7 that is used for transporting a sheet housed in the intermediate sheet container 42 toward the above-mentioned third transport path R3. The image forming portion 10 further includes: a routing mechanism 43 that is disposed on the downstream side of the image scanner 100 in a sheet transport direction, and selects the route of a sheet between the fifth transport path R5 used for transporting the sheet toward the sheet stacking portion 44 and the sixth transport path R6 used for transporting the sheet toward the intermediate sheet container 42; feed rolls 45 that feed a sheet housed in the intermediate sheet container 42 to transport the sheet toward the seventh transport path R7.

<Description of Image Forming Operation>

Next, a basic image forming operation performed by the image forming apparatus 1 according to the present exemplary embodiment is described by using FIGS. 1 and 2.

The image forming units 11 of the image forming portion 10 form toner images of the respective colors of C, M, HC, HM, Y and K with an electrophotographic process using the above-described functional members. The color toner images formed by the respective image forming units 11 are primarily transferred onto the intermediate transfer belt 20 sequentially by the respective primary transfer rolls 21, so that a combined toner image in which the color toners are superimposed is formed. With the movement of the intermediate transfer belt 20 (in its arrow direction), the combined toner image on the intermediate transfer belt 20 is transported to the secondary transfer region Tr in which the secondary transfer roll 22 is disposed.

Meanwhile, in the sheet transporting system, the feed rolls 41A and 41B rotate in accordance with the start timing of the image formation performed by the image forming units 11. Thereby, one of sheets in the sheet container 40A or 40B selected through the UI portion 90, for example, is fed by the corresponding feed roll 41A or 41B. The sheet fed by the feed roll 41A or 41B is transported to the secondary transfer region Tr along the first transport path R1 or the second transport path R2, and the third transport path R3.

In the secondary transfer region Tr, the combined toner image held on the intermediate transfer belt 20 is secondarily transferred onto the sheet collectively with a transfer electric field formed by the secondary transfer roll 22.

After that, the sheet onto which the combined toner image is transferred is separated from the intermediate transfer belt 20, and is then transported toward the nip portion N of the fixing unit 60 along the fourth transport path R4. The unfixed toner image on the surface of the sheet passing through the nip portion N is fixed on the sheet by pressure and heat acting mainly on a roll nip portion N1.

To be more specific, in the fixing unit 60 of the present exemplary embodiment, the heat to act on the roll nip portion N1 is supplied mainly through the fixing belt 610. The fixing belt 610 is heated by: heat supplied through the fixing roll 611 by the halogen heater 71 disposed inside of the fixing roll 611; heat supplied through the inner heating roll 612 by the halogen heater 72 disposed inside of the inner heating roll 612; and heat supplied through the outer heating roll 613 by the halogen heater 73 disposed inside of the outer heating roll 613. This configuration allows thermal energy to be supplied not only through the fixing roll 611 but also through the inner heating roll 612 and the outer heating roll 613. Accordingly, a sufficient amount of heat supply is secured in the roll nip portion N1 even at a high process speed.

After passing through the roll nip portion N1, the sheet is transported to a peeling pad nip portion N2. The peeling pad nip portion N2 has such a configuration that the peeling pad 64 is pressed against the pressure roll 62 and that the fixing belt 610 is in pressure contact with the pressure roll 62. Accordingly, the peeling pad nip portion N2 has a shape curving upward due to the curvature of the pressure roll 62, whereas the roll nip portion N1 has a shape curving downward due to the curvature of the fixing roll 611.

Accordingly, the sheet heated and pressurized with the curvature of the fixing roll 611 in the roll nip portion N1 changes its traveling direction in the peeling pad nip portion N2 according to the curvature of the pressure roll 62, which is curved in an opposite direction. In this direction change, an extremely little slippage occurs between the toner image on the sheet and the surface of the fixing belt 610. Thereby, adhesion between the toner image and the fixing belt 610 weakens, which facilitates the sheet to be peeled off the fixing belt 610. Hence, the peeling pad nip portion N2 may be regarded as a preparation step for secure peeling in a final peeling step.

Then, since the fixing belt 610 is transported so as to wind around the peeling pad 64 at an exit of the peeling pad nip portion N2, the transport direction of the fixing belt 610 drastically changes at this exit. To be more specific, since the fixing belt 610 moves along the outer surface of the peeling pad 64, the fixing belt 610 is caused to form a large curve. For this reason, the sheet whose adhesion to the fixing belt 610 is weakened in the peeling pad nip portion N2 is separated from the fixing belt 610 by the resiliency of the sheet itself.

Then, the traveling direction of the sheet separated from the fixing belt 610 is guided by a peeling guide plate 69 disposed on the downstream side of the peeling pad nip portion N2. The sheet guided by the peeling guide plate 69 is thereafter transported toward the cooling unit 80 by an exit belt 79, and is cooled by the cooling unit 80. A curl of the sheet is then corrected by the curl correction unit 85, and the image recorded on the sheet is scanned by the image scanner 100. After that, in a simplex printing mode, the sheet having passed through the image scanner 100 is guided by the switching mechanism 43 to the fifth transport path R5, and is transported toward the sheet stacking portion 44.

The cleaners 16 remove toner attached to the photoconductive drums 12 after the primary transfer (residual toner after the primary transfer), and a belt cleaner 26 removes toner attached to the intermediate transfer belt 20 after the secondary transfer (residual toner after the secondary transfer).

In a duplex printing mode, on the other hand, after the sheet having the first surface on which the image is fixed by the above-described process passes through the image scanner 100, the sheet is guided by the switching mechanism 43 to the sixth transport path R6 and transported in the sixth transport path R6 to the intermediate sheet container 42. Then, in accordance with the timing at which the image forming units 11 start image formation on a second surface of the sheet, the feed rolls 45 rotate again and feed the sheet from the intermediate sheet container 42. The sheet picked up by the feed rolls 45 is transported along the seventh transport path R7 and the third transport path R3, and reaches the secondary transfer region Tr.

In the secondary transfer region Tr, as in the case of the first surface, the color toner images for the second surface held on the intermediate transfer belt 20 are secondarily transferred onto the sheet collectively with the transfer electric field formed by the secondary transfer roll 22.

Then, as in the case of the first surface, the sheet having the toner images transferred onto both surfaces thereof undergoes fixing at the fixing unit 60, and is cooled by the cooling unit 80. A curl of the sheet is then corrected by the curl correction unit 85, and the image recorded on the sheet is scanned by the image scanner 100. After that, the sheet having passed through the image scanner 100 is guided by the switching mechanism 43 to the fifth transport path R5, and is transported toward the sheet stacking portion 44.

In a manner described above, the image formation process of the image forming apparatus 1 is repeated in cycles for the number of prints to be produced.

<Description of Image Scanner>

Figure 3:
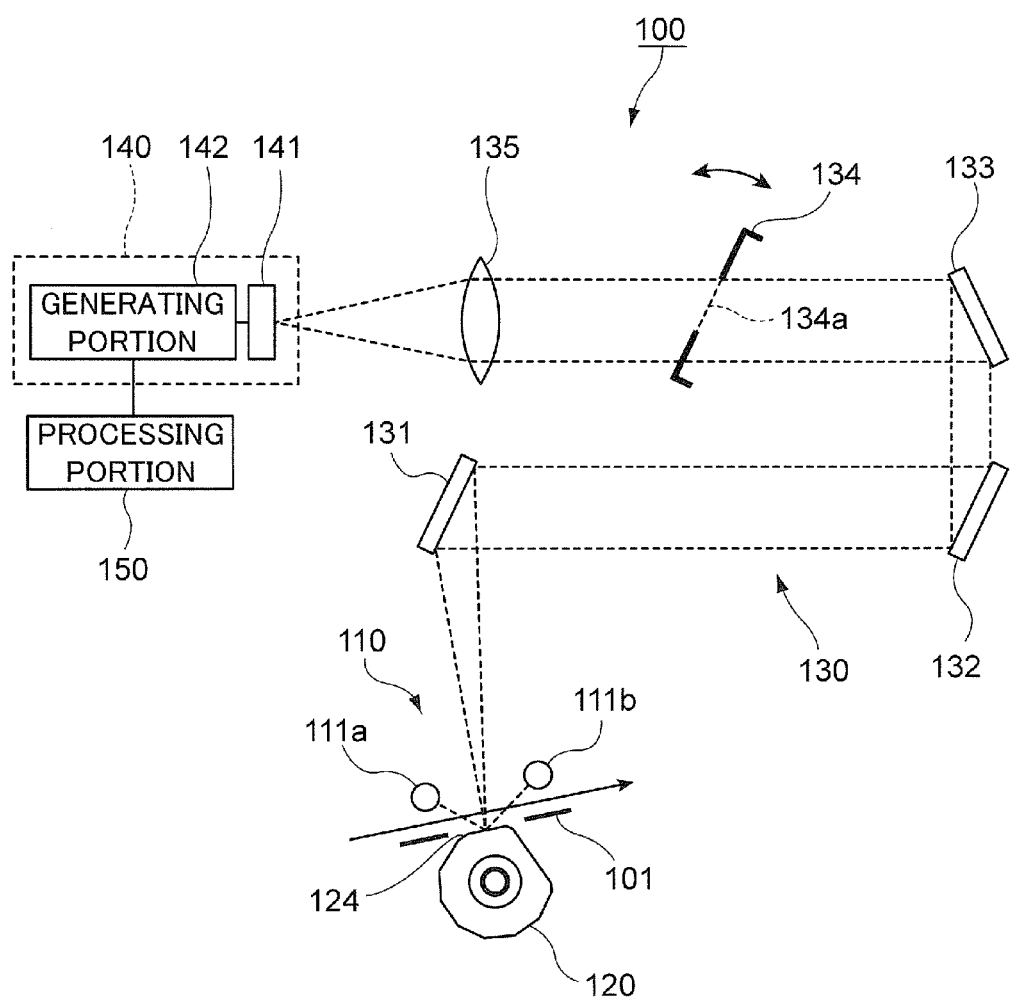
FIG. 3 is a diagram illustrating the image scanner of the exemplary embodiment.

FIG. 3 is a diagram illustrating the image scanner 100 of the present exemplary embodiment.

The image scanner 100 of the present exemplary embodiment is an example of a scanner unit that scans an image on a sheet on which a toner image is fixed by the fixing unit 60. The image scanner 100 includes: a light source 110 that irradiates, with light, a sheet on which an image is formed; a scanning accuracy measuring unit 120 as an example of a measuring portion that has various measurement surfaces in order to adjust the image scanner 100; an optical system 130 that guides light reflected by the sheet or the scanning accuracy measuring unit 120; a charge coupled device (CCD) sensor 140 that converts the light guided by the optical system 130 into light amount data; a processing portion 150 that derives a correlation formula for a predetermined light amount value and a light amount value generated when reflecting surfaces in the scanning accuracy measuring unit 120 are irradiated with the light from the light source 110. Detail of the processing portion 150 will be described later.

In the present exemplary embodiment, the light source 110 is formed of a pair of straight tubes of xenon fluorescent lamps 111a and 111b. The light source 110 irradiates, with light, a sheet that passes on a transporting surface while guided by a guide surface 101, to generate reflected light as information on an image formed on the sheet.

In the present exemplary embodiment, forming the light source 110 by use of a pair of the xenon fluorescent lamps 111a and 111b makes illumination intensity of light with which the sheet is irradiated hardly change even when the sheet is transported obliquely with respect to the transporting surface. Specifically, if only one of the xenon fluorescent lamps is provided, then the illumination intensity of light with which the sheet is irradiated easily changes when the sheet is inclined. In this case, an image might not be normally scanned.

Figure 4:
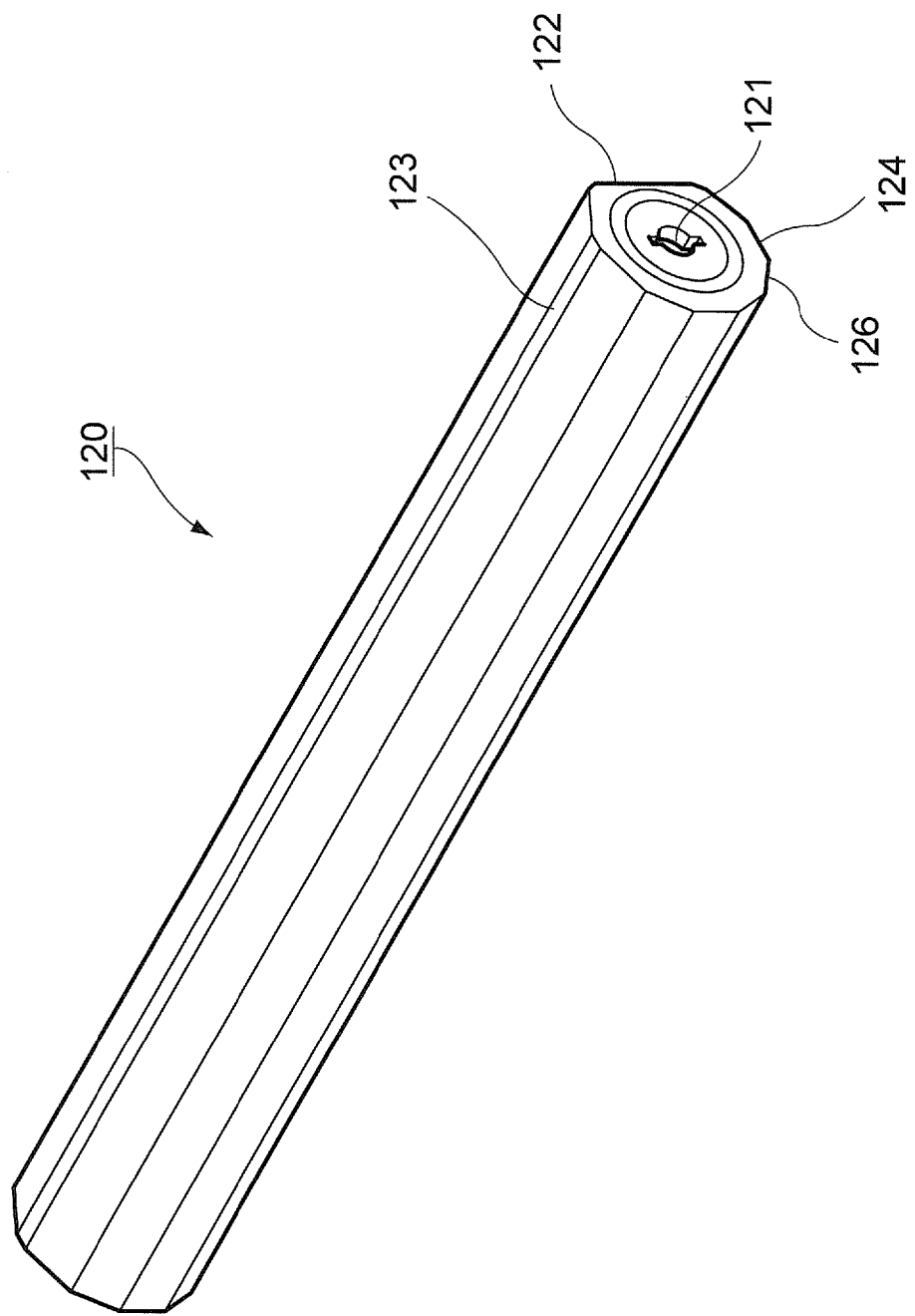
FIG. 4 is a diagram illustrating the scanning accuracy measuring unit.

FIG. 4 is a diagram illustrating the scanning accuracy measuring unit 120.

The scanning accuracy measuring unit 120 of the present exemplary embodiment is a roll of a dodecagonal prism having twelve surfaces on a side portion thereof. These surfaces serve as various measurement surfaces for adjusting the image scanner 100. The scanning accuracy measuring unit 120 is made of aluminum, for example, and has the twelve surfaces processed by cutting. From the viewpoint of suppressing errors in measurement, the scanning accuracy measuring unit 120 is made by anodizing the surfaces thereof in black and by sticking a chart for measurement on a predetermined surface thereof by use of a double-sided tape or the like. The scanning accuracy measuring unit 120 has an axis portion 121 to which a stepping motor (not shown) and a speed reduction gear (not shown) are connected, and is rotatable around the axis portion 121. This configuration allows the measurement surfaces required for adjusting the image scanner 100 to face to the transporting surface of sheets.

In the present exemplary embodiment, measurement surfaces 124 and 126 are provided as the measurement surfaces. Additionally, plural reflecting surfaces having predetermined colors different from each other are arranged on the measurement surfaces 124 and 126. As will be described later in detail, the measurement surface 124 is provided with a white reference plate as a reflecting surface in order to perform color calibration of white, in the present exemplary embodiment. The measurement surface 126 is provided with a color reference plate consisting of various color patches as a reflecting surface in order to perform color calibration of scanned data.

In the present exemplary embodiment, the scanning accuracy measuring unit 120 is provided with a retraction surface 122 and a sheet holding surface 123 in addition to the measurement surfaces 124 and 126.

The retraction surface 122 is a surface used for avoiding interference between the scanning accuracy measuring unit 120 and a sheet. As will be described later in detail, it is when calibration of the image scanner 100 or the image forming units 11 is performed on the occasion of turning-on or the like of the power of the image forming apparatus 1, for example, that the image scanner 100 operates in the present exemplary embodiment. Thus, on the occasion of usual image formation, the image scanner 100 does not operate and a sheet only passes through the image scanner 100. For this reason, on the occasion of usual image formation, it is desirable that the scanning accuracy measuring unit 120 retract to a position where the scanning accuracy measuring unit 120 does not come into contact with a sheet. The retraction surface 122 is a surface having larger area as compared with the other measurement surfaces, and may be made by being subjected to more cutting than the other surfaces at the time when the twelve surfaces on the side portion of the scanning accuracy measuring unit 120 are made. The retraction surface 122 is placed below the transporting surface of sheets when the scanning accuracy measuring unit 120 is rotated to turn this retraction surface 122 to the transporting surface of sheets, which results in non-interference between the sheet and the retraction surface 122. By this configuration, the scanning accuracy measuring unit 120 is capable of retracting to a position where the scanning accuracy measuring unit 120 does not come into contact with a sheet, on the occasion of usual image formation.

The sheet holding surface 123 is a surface to be turned to the transporting surface of sheets when calibration of the image forming units 11 is performed. The sheet holding surface 123 is formed so as to be placed slightly above the transporting surface of sheets at the time when the sheet holding surface 123 is turned to the transporting surface of sheets. When a sheet passes through the image scanner 100, the sheet holding surface 123 guides the sheet together with the guide surface 101 and thereby allows the sheet to pass through so that the sheet may fit a predetermined transporting surface more. Accordingly, unevenness of scanning may be reduced more when an image on a sheet is scanned.

Returning to FIG. 3, the optical system 130 is formed of mirrors 131, 132 and 133, a diaphragm 134 and a lens 135. Light reflected on a sheet or each measurement surface of the scanning accuracy measuring unit 120 is reflected by the mirrors 131, 132 and 133, and is then reduced by the diaphragm 134 so as to have a predetermined light amount. The diaphragm 134 has a window portion 134a at a center portion thereof, and is rotatable around the window portion 134a in the direction of an arrow. Thus, by rotating the diaphragm 134, the amount of light passing through the window portion 134a may be changed and reduced to the predetermined light amount. The light is then linearly condensed by the lens 135 and forms an image on the CCD sensor 140. The line to which the light is condensed extends in the direction perpendicular to the paper of FIG. 3, for example.

The CCD sensor 140 includes CCDs 141 arranged in lines, as an example of a light receiving portion that receives light reflected by a sheet. In the present exemplary embodiment, the CCDs 141 corresponding to colors of R (red), G (green) and B (blue) are arranged in three lines, and make it possible to measure an image recorded on a sheet, by means of the colors of RGB. That is, the CCD sensor 140 is a three-line color CCD. Light received by the CCDs 141 is photoelectrically converted to an electric charge. This electric charge is transferred to a generating portion 142.

The generating portion 142 detects the electric charge transferred from the CCDs 141 to generate an electric signal. This electric signal will be light amount data (a light amount value) that is information for adjusting the image forming units 11. Specifically, the generating portion 142 makes information for adjusting an image formed on a sheet, by use of light received by the CCDs 141. The information corresponds to the light amount data. Since the CCDs 141 are color CCDs for the three colors of R (red), G (green) and B (blue), the generating portion 142 generates R, G and B signals that are light amount data corresponding to the respective colors.

<Description of Measurement Surface>

Next, the measurement surfaces provided for the scanning accuracy measuring unit 120 are described in more detail.

Figure 5:
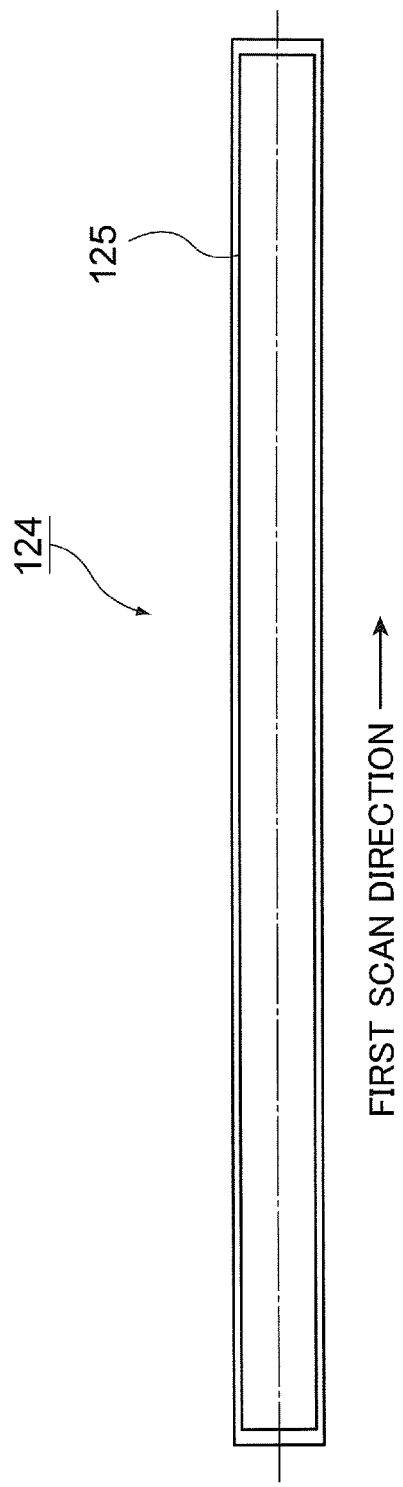
FIG. 5 is a diagram illustrating the measurement surface provided with a white reference plate that is an example of a reflecting surface used for performing color calibration of white.

FIG. 5 is a diagram illustrating the measurement surface 124 provided with a white reference plate that is an example of a reflecting surface used for performing color calibration of white.

As shown in FIG. 5, the measurement surface 124 is provided with a white reference plate 125 formed of a predetermined white film. In the present exemplary embodiment, a white polyester film or the like may be used as this white reference plate 125. The white reference plate 125 is fixed to the measurement surface 124 by use of a double-sided tape or the like, for example.

In the present exemplary embodiment, shading correction, for example, may be performed by using this white reference plate 125. That is, variations in a light amount distribution relating to the longitudinal direction (a first scan direction) of the tubes of the xenon fluorescent lamps 111a and 111b, which are the light source 110, may be corrected.

Figure 6:
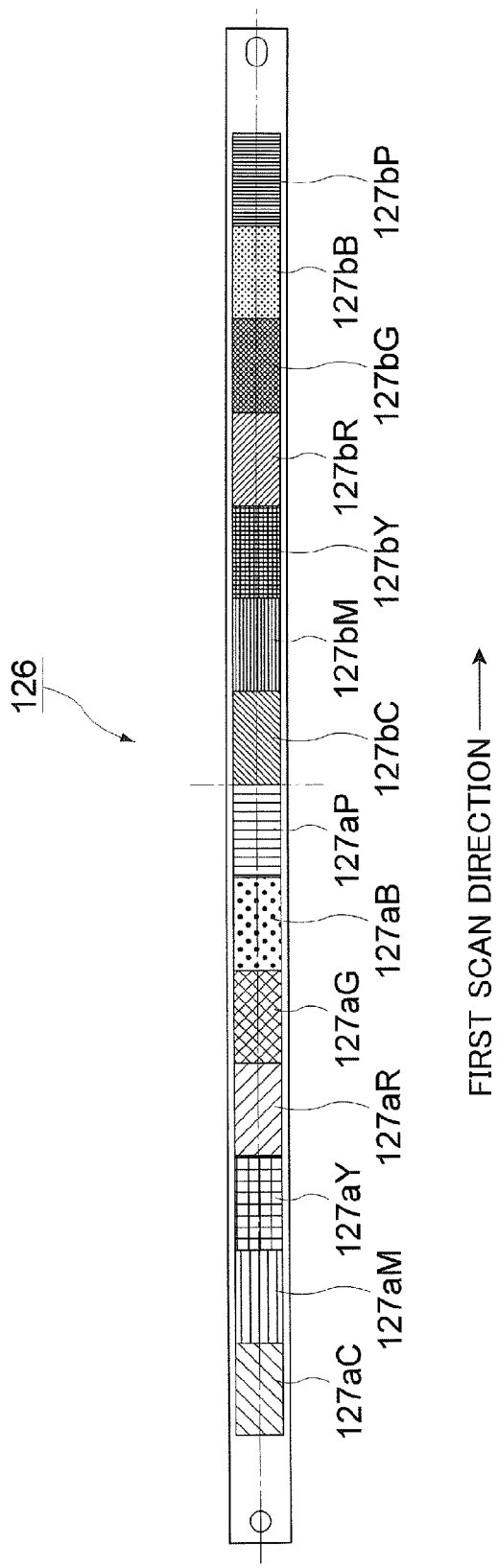
FIG. 6 is a diagram illustrating the measurement surface provided with color reference plates that are an example of reflecting surfaces used for performing color calibration of scanned data.

FIG. 6 is a diagram illustrating the measurement surface 126 provided with color reference plates that are an example of reflecting surfaces used for performing color calibration of scanned data.

On the measurement surface 126 shown in FIG. 6, plural color reference plates having predetermined colors different from each other are arranged in the longitudinal direction of the measurement surface 126.

In the present exemplary embodiment, as shown in FIG. 6, color patches having fourteen different colors are used as the color reference plates. The color reference plates each have a size of 10 mm times 20 mm, for example, and are arranged in one line in the first scan direction. Among these, seven color reference plates 127aC, 127aM, 127aY, 127aR, 127aG, 127aB and 127aP arranged on one side with respect to a center portion of the measurement surface 126 in the longitudinal direction are color reference plates of so-called highlight, and are those whose reflectance is set at 20%. In the present exemplary embodiment, these correspond to C (cyan), M (magenta), Y (yellow), R (red), G (green), B (blue) and P (process black) colors, respectively. On the other hand, seven color reference plates 127bC, 127bM, 127bY, 127bR, 127bG, 127bB and 127bP arranged on the other side with respect to the center portion of the measurement surface 126 in the longitudinal direction are color reference plates of so-called shadow, and are corresponding ones whose reflectance is set at 60%. These colors have the same order as those of the color reference plates of highlight. In the present exemplary embodiment, the above-described color reference plates 127aC, 127aM, 127aY, 127aR, 127aG, 127aB, 127aP, 127bC, 127bM, 127bY, 127bR, 127bG, 127bB and 127bP may be collectively referred to as color reference plates 127.

<Description of Time-Varying Correction Formula>

Next, a description is given of a procedure to obtain a time-varying correction formula that is a correlation formula expressing a time-varying change in the light source 110, from light amount data generated at predetermined reference time and from light amount data generated when the white reference plate 125 and the color reference plates 127 of the scanning accuracy measuring unit 120 are irradiated with the light from the light source 110.

Suppose that the reference time is a time point (T0) when the xenon fluorescent lamps 111a and 111b, which are the light source 110, are started to light up. Herein, a description is given of a case where a time-varying correction formula is obtained from light amount data generated at the time and from light amount data generated after cumulative 500 time (T500) since the xenon fluorescent lamps 111a and 111b are started to light up. Note that the reference time may be a time point when the light source is started to use by an end-user.

First, at T0, the color reference plates 127bM and 127aM of M color among the color reference plates 127 and the white reference plate 125 are irradiated with light from the light source 110. Thereby, G signals are acquired as light amount data. Here, denote by yi (i=1, 2, 3) these pieces of light amount data, respectively.

At T500, G signals are acquired as light amount data in a similar manner. Here, denote by xi (i=1, 2, 3) these pieces of light amount data, respectively.

An example of yi and xi (i=1, 2, 3) acquired as described above is shown in the following Table 1.

TABLE 1

| Reference Plate | Light Amount Data | T0 | T500 |
|---|---|---|---|
| Color Reference Plate M60% | G signal | y1 = 405 | x1 = 390 |
| Color Reference Plate M20% | G signal | y2 = 805 | x2 = 790 |
| White Reference Plate | G signal | y3 = 1023 | x3 = 1023 |

These yi and xi (i=1, 2, 3) are substituted into the following expression (1) to obtain the values of a and b.

$$a = \frac{n\sum x_i y_i - \sum x_i \sum y_i}{n\sum x_i^2 - (\sum x_i)^2} \quad (1)$$

$$b = \frac{(\sum y_i - a\sum x_i)}{n}$$

Denote by y and x the light amount data at T0 and T500, respectively, and suppose a linear function y=ax+b (a: slope, b: intercept) as a time-varying correction formula of these y and x. Then, the values a and b in the expression (1) correspond to the slope a and the intercept b of the linear function.

As for yi and xi shown in Table 1, a=0.978877 and b=25.51111. Thus, the time-varying correction formula is y=0.978877x+25.51111.

Figure 7:
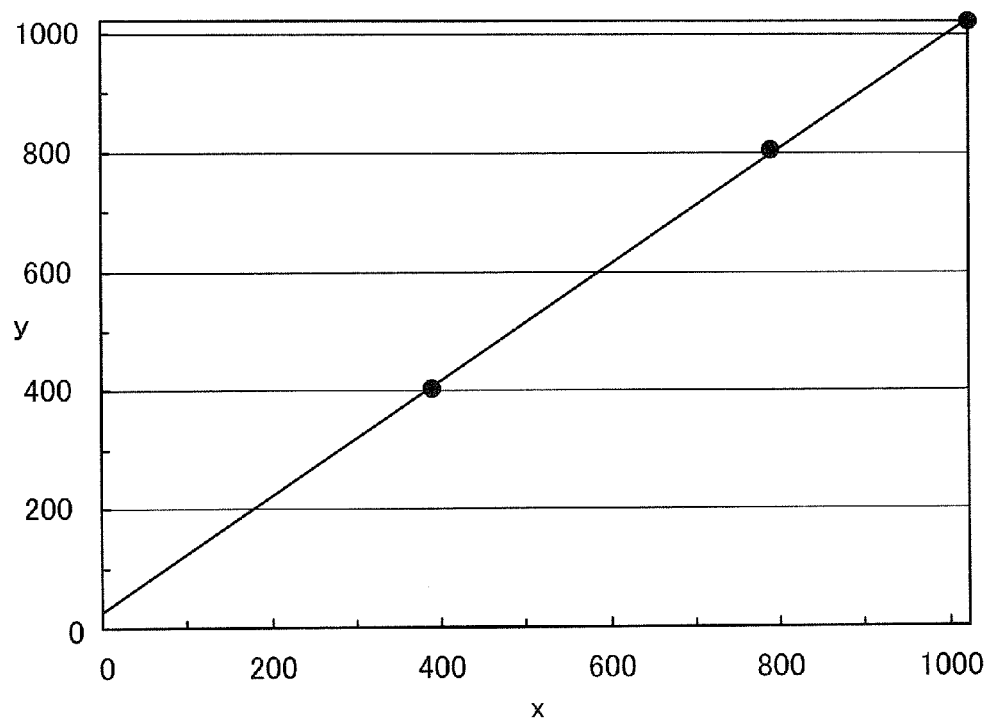
FIG. 7 is a graph showing plots of xi and yi (i=1, 2, 3) and the time-varying correction formula.

FIG. 7 shows a graph of plots of xi and yi (i=1, 2, 3) and the time-varying correction formula. As described above, use of the white reference plate 125 and the color reference plates 127, which are reference plates having reflectance different from each other, makes it possible to obtain a time-varying correction formula expressing a time-varying change in the light source 110. Additionally, use of this time-varying correction formula makes it possible to correct a scanned value even when there is a change in spectral radiation characteristics of light emitted from the light source 110.

Similarly, R and B signals are used as light amount data to derive respective time-varying correction formulae.

Furthermore, the other color reference plates 127 are used to derive respective time-varying correction formulae. Specifically, the white reference plate 125 and each of combinations for C color (the color reference plate 127bC and the color reference plate 127aC), Y color (the color reference plate 127bY and the color reference plate 127aY), R color (the color reference plate 127bR and the color reference plate 127aR), G color (the color reference plate 127bG and the color reference plate 127aG), B color (the color reference plate 127bB and the color reference plate 127aB) and P color (the color reference plate 127bP and the color reference plate 127aP) are used to derive respective time-varying correction formulae for G, R and B signals. By the above procedure, the time-varying correction formulae corresponding to the three colors of G, B and R are derived relating to each of the above-described colors.

<Description of Difference Correction Formula>

Next, a description is given of a procedure to obtain a difference correction formula that is a correlation formula expressing differences between devices in scanning light amount data, from predetermined light amount data and from light amount data generated when the white reference plate 125 and the color reference plates 127 of the scanning accuracy measuring unit 120 are irradiated with the light from the light source 110.

Here, light amount data obtained by using a standard machine body is employed as the predetermined light amount data. The standard machine body is an image scanner 100 that is composed of standard components and scans light amount data having no deviation. By comparison with this predetermined light amount data, a difference correction formula expressing differences between devices for an image scanner 100 (hereinafter, referred to as "machine body A") to be corrected is obtained.

First, at T0, by using the standard machine body, the color reference plates 127bM and 127aM of M color among the color reference plates 127 and the white reference plate 125 are irradiated with light from the light source 110. Thereby, G signals are acquired as light amount data. Here, denote by yi (i=1, 2, 3) these pieces of light amount data, respectively.

Similarly at T0, G signals are acquired as light amount data by using the color reference plates 127bM and 127aM of M color among the color reference plates 127 and the white reference plate 125 of the machine body A. Here, denote by xi (i=1, 2, 3) these pieces of light amount data, respectively.

An example of yi and xi (i=1, 2, 3) acquired as described above is shown in the following Table 2.

TABLE 2

| Reference Plate | Light Amount Data | Standard Machine Body | Machine Body A |
|---|---|---|---|
| Color Reference Plate M60% | G signal | y1 = 400 | x1 = 405 |
| Color Reference Plate M20% | G signal | y2 = 800 | x2 = 805 |
| White Reference Plate | G signal | y3 = 1023 | x3 = 1023 |

These yi and xi (i=1, 2, 3) are substituted into the above-mentioned expression (1) to obtain the values of a and b.

Denote by y and x the light amount data of the standard machine body at T0 and that of the machine body A at T0, respectively, and suppose a linear function y=ax+b (a: slope, b: intercept) as a difference correction formula of these y and x. Then, the values a and b in the expression (1) correspond to the slope a and the intercept b of the linear function.

As for yi and xi shown in Table 2, a=1.007091 and b=−8.61168. Thus, the difference correction formula is y=1.007091x−8.61168.

Figure 8:
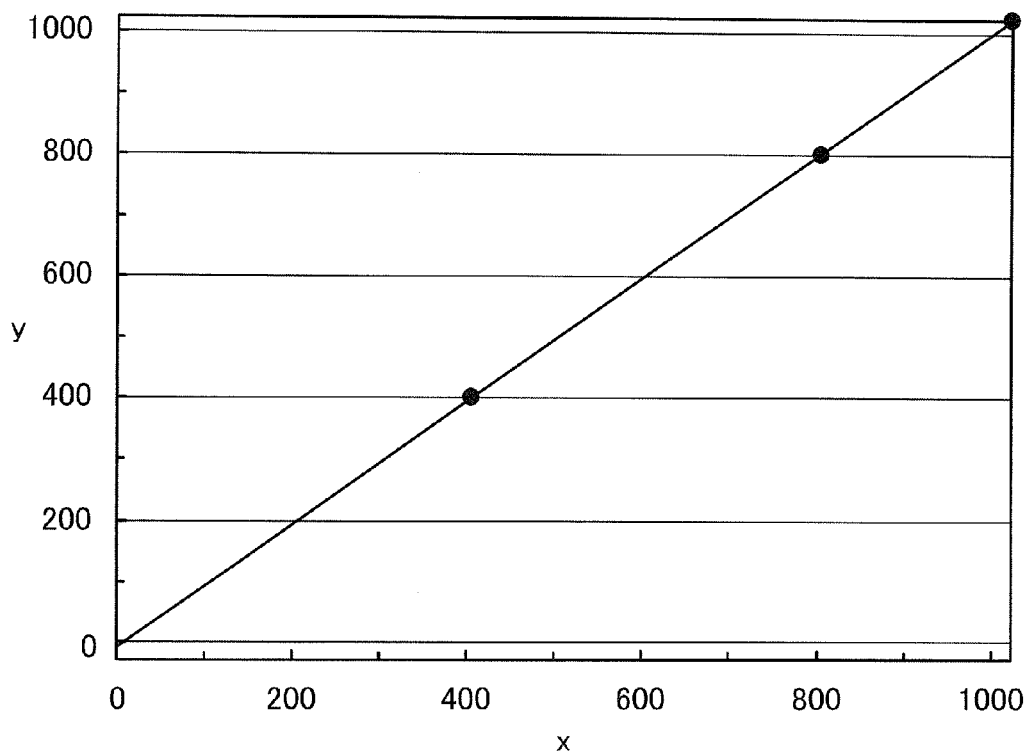
FIG. 8 is a graph showing plots of xi and yi (i=1, 2, 3) and the difference correction formula.

FIG. 8 shows a graph of plots of xi and yi (i=1, 2, 3) and the difference correction formula. As described above, use of the white reference plate 125 and the color reference plates 127, which are reference plates having reflectance different from each other, makes it possible to obtain a difference correction formula expressing differences between devices of the image scanner 100. Additionally, use of this difference correction formula makes it possible to correct a change in a scanned value due to the differences between devices.

Similarly, R and B signals are used as light amount data to derive respective difference correction formulae.

Furthermore, the other color reference plates 127 are used to derive respective difference correction formulae. Specifically, the white reference plate 125 and each of combinations for C color (the color reference plate 127bC and the color reference plate 127aC), Y color (the color reference plate 127bY and the color reference plate 127aY), R color (the color reference plate 127bR and the color reference plate 127aR), G color (the color reference plate 127bG and the color reference plate 127aG), B color (the color reference plate 127bB and the color reference plate 127aB) and P color (the color reference plate 127bP and the color reference plate 127aP) are used to derive respective difference correction formulae for G, R and B signals. By the above procedure, the difference correction formulae corresponding to the three colors of G, B and R are derived relating to each of the above-described colors.

The time-varying correction formulae and the difference correction formulae are each assumed to be a linear function y=ax+b in the above-described example, but are not limited thereto. A higher order polynomial function, such as a quadratic function $y=ax^2+bx+c$, may be employed. In a case where a linear function y=ax+b is obtained as the time-varying correction formula or the difference correction formula, although three points defined by xi and yi (i=1, 2, 3) are used in the above-described example, the linear function may be obtained by use of at least two points. Additionally, although light amount data at T0 and T500 is used in the above-described example, the light amount data is not limited thereto and may be set without restraint.

Next, specific usages of the above-described time-varying correction formula are described.

Figure 9:
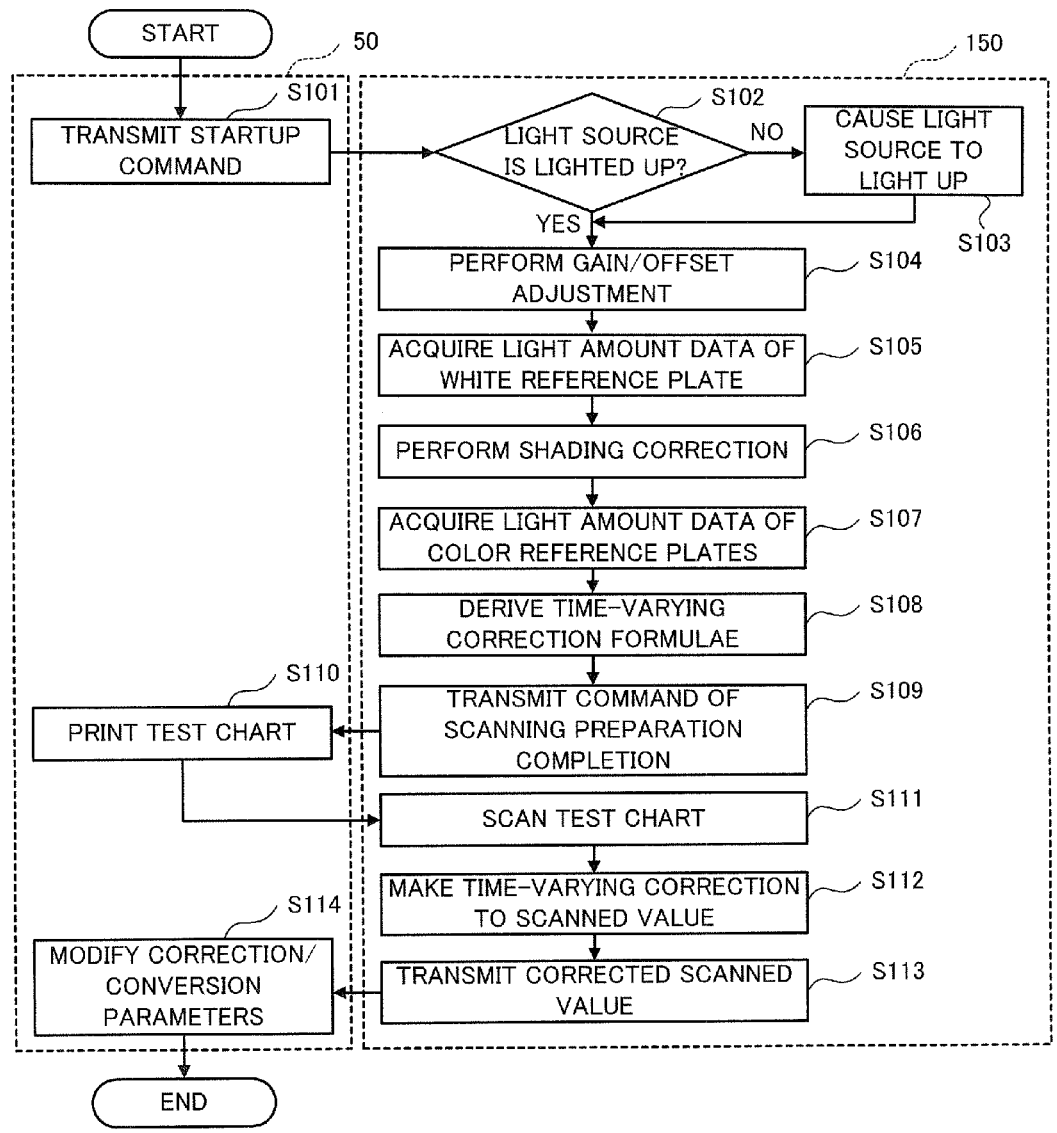
FIG. 9 is a flowchart illustrating a first example in which time-varying correction to a scanned value of the image scanner is made by using the time-varying correction formulae.

FIG. 9 is a flowchart illustrating a first example in which time-varying correction to a scanned value of the image scanner 100 is made by using the time-varying correction formulae.

First, the main controller 50 (see FIG. 1) of the image forming apparatus 1 transmits a startup command to the image scanner 100 (Step 101). The startup command transmitted to the image scanner 100 is received by the processing portion 150 (see FIG. 3) of the image scanner 100. The processing portion 150 first determines whether or not the light source 110 is lighted up (Step 102). If the light source 110 is not lighted up, the processing portion 150 causes the light source 110 to light up (Step 103). Then, while the light source 110 is lighted up, the processing portion 150 performs gain/offset adjustment of the CCD sensor 140 (Step 104). The processing portion 150 next rotates the scanning accuracy measuring unit 120 to turn the measurement surface 124 provided with the white reference plate 125 to the transporting surface of sheets. The processing portion 150 then causes the light source 110 to irradiate the white reference plate 125 with light, acquires light amount data by use of the white reference plate 125 (Step 105), and performs shading correction (Step 106). The processing portion 150 next rotates the scanning accuracy measuring unit 120 again to turn the measurement surface 126 provided with the color reference plates 127 to the transporting surface of sheets. The processing portion 150 then causes the light source 110 to irradiate the color reference plates 127 with light and acquires light amount data by use of the color reference plates 127 (Step 107).

The processing portion 150 then derives the time-varying correction formulae from the light amount data acquired by use of the white reference plate 125 and the color reference plates 127 (Step 108). Now, calibration of the image scanner 100 is finished, and preparation for scanning an image is completed. The processing portion 150 then transmits a command of scanning preparation completion to the main controller 50 (Step 109).

The main controller 50 having received the command of scanning preparation completion prints a test chart on the image forming portion 10 (see FIG. 1), and causes the printed test chart to be transported to the image scanner 100 (Step 110). The image scanner 100 then scans the test chart, and the scanned value as light amount data is sent to the processing portion 150 (Step 111). The processing portion 150 next makes time-varying correction to the scanned value by using the time-varying correction formulae (Step 112). Test patterns of the above-described C (cyan), M (magenta), Y (yellow), R (red), G (green), B (blue) and P (process black) colors are printed on the test chart. Thus, for each of these colors, time-varying correction is made by using the time-varying correction formulae corresponding to the three colors of R (red), G (green) and B (blue). Among the above test patterns, a test pattern of K (black) color is also printed as black color, in addition to the test pattern of P (process black) color. The time-varying correction formula for P (process black) color may be used for time-varying correction relating to this K (black) color without any modification.

The processing portion 150 transmits the corrected scanned value to the main controller 50 (Step 113). The main controller 50 modifies each of correction/conversion parameters on the basis of the corrected scanned value, in order to adjust an toner image to be formed by the image forming units 11 (Step 114). As described above, calibration of the image forming units 11 may be performed.

By the above procedure, time-varying correction to a value scanned by the image scanner 100 may be made by using the time-varying correction formulae. The reason why a time-varying change occurs in the scanned value is that spectral radiation characteristics of the xenon fluorescent lamps 111a and 111b, which are the light source 110, change over time, for example. Specifically, light emission of the xenon fluorescent lamps 111a and 111b is caused by the following manner: a xenon gas sealed in the xenon fluorescent lamps 111a and 111b is first excited by electric discharge to generate ultraviolet rays; and the ultraviolet rays are converted into visible light by phosphors applied to the inner sides of the xenon fluorescent lamps 111a and 111b. The phosphors include those which emit light of three colors of R (red), G (green) and B (blue) mixed therein, and thus emit white light having a predetermined color temperature. However, the phosphors, especially the phosphor of B (blue), are likely to deteriorate. For this reason, light emission of B (blue) tends to relatively decrease as compared with that of R (red) and G (green), and thus the spectral radiation characteristics of the xenon fluorescent lamps 111a and 111b are changed.

Figure 10:
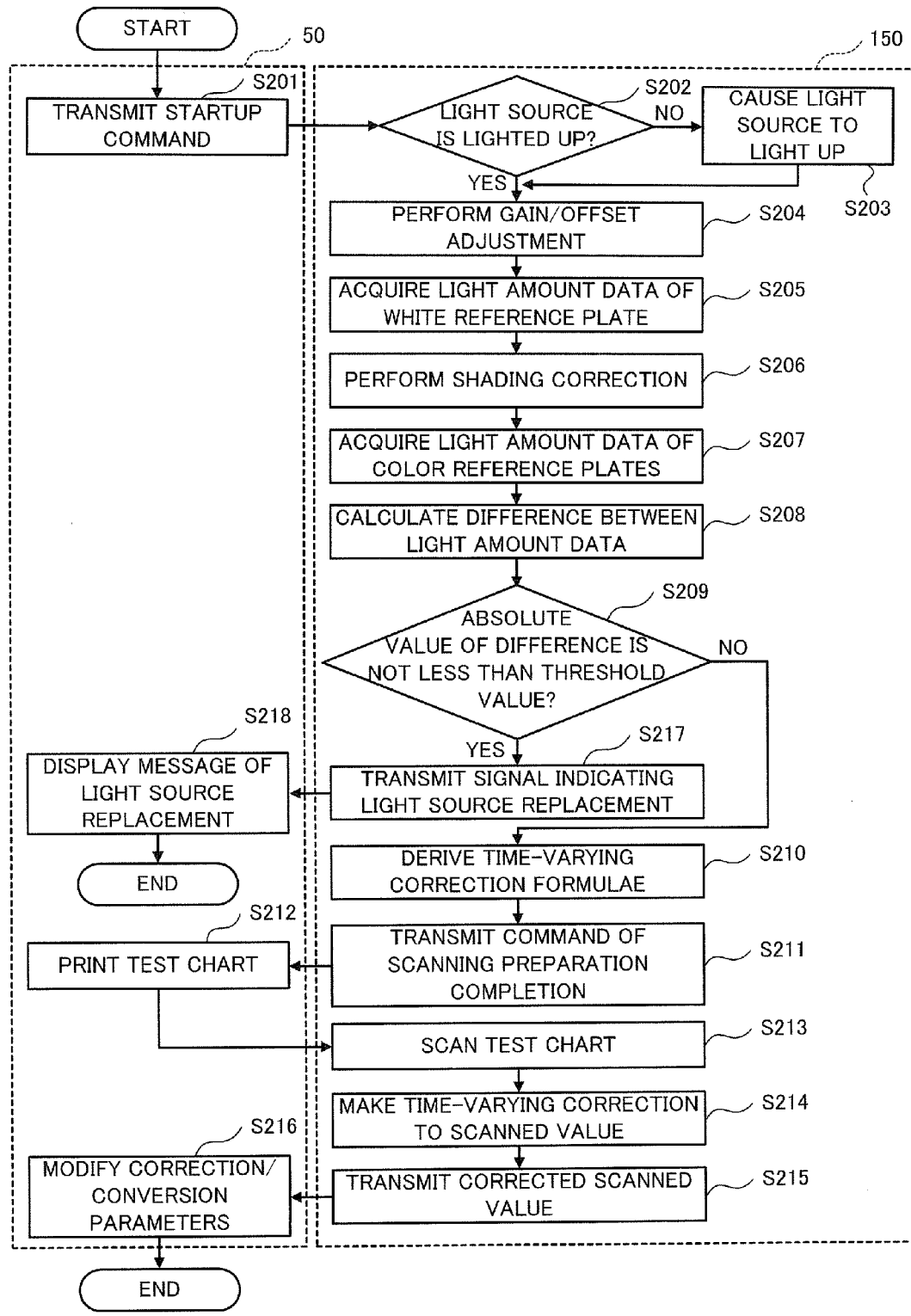
FIG. 10 is a flowchart illustrating a second example in which time-varying correction to a scanned value of the image scanner is made by using the time-varying correction formulae.

FIG. 10 is a flowchart illustrating a second example in which time-varying correction to a scanned value of the image scanner 100 is made by using the time-varying correction formulae.

Processing in Steps 201 to 207 is similar to that in Steps 101 to 107 described with FIG. 9.

In FIG. 10, after acquiring the light amount data by use of the color reference plates 127, the processing portion 150 calculates a difference from the light amount data for T0, in regard to the light amount data obtained by use of the white reference plate 125 and that obtained by use of the color reference plates 127 (Step 208). The processing portion 150 then determines whether or not the absolute value of this difference is not less than a predetermined threshold value (Step 209). If the absolute value of the difference is less than the predetermined threshold value, processing in Steps 210 to 216 is carried out. The processing in Steps 210 to 216 is similar to that in Steps 108 to 114 described with FIG. 9.

Meanwhile, if the absolute value of the difference is not less than the predetermined threshold value in Step 209, the processing portion 150 transmits, to the main controller 50, a signal indicating that the light source 110 needs replacing (Step 217). The main controller 50 then causes the user interface portion 90 (see FIG. 1) to display a message that is a prompt to replace the xenon fluorescent lamps 111a and 111b, which are the light source 110, to inform a user (Step 218).

Such processing makes it possible to inform a user of necessity for replacing the light source 110 at appropriate time by using light amount data.

Figure 11:
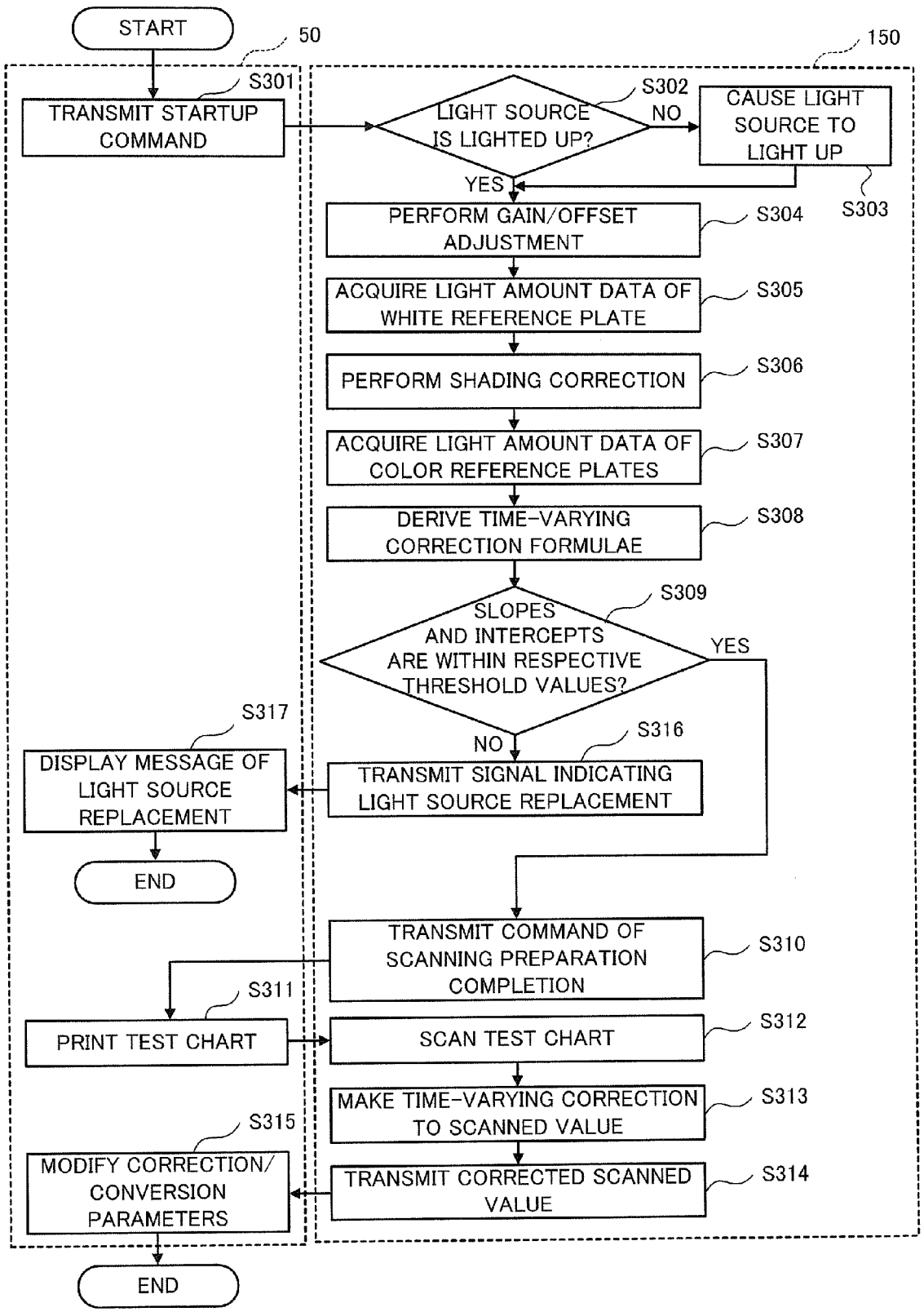
FIG. 11 is a flowchart illustrating a third example in which time-varying correction to a scanned value of the image scanner is made by using the time-varying correction formulae.

FIG. 11 is a flowchart illustrating a third example in which time-varying correction to a scanned value of the image scanner 100 is made by using the time-varying correction formulae.

Processing in Steps 301 to 308 is similar to that in Steps 101 to 108 described with FIG. 9.

In FIG. 11, after deriving the time-varying correction formulae, the processing portion 150 determines whether or not the slopes (a) and the intercepts (b) of the time-varying correction formulae are within respective ranges each having a predetermined threshold value (Step 309). If the slopes and the intercepts are within the respective ranges, processing in Steps 310 to 315 is carried out. The processing in Steps 310 to 315 is similar to that in Steps 109 to 114 described with FIG. 9.

Meanwhile, if the slopes and the intercepts are beyond the respective ranges, the processing portion 150 transmits, to the main controller 50, a signal indicating that the light source 110 needs replacing (Step 316). The main controller 50 then causes the user interface portion 90 (see FIG. 1) to display a message that is a prompt to replace the xenon fluorescent lamps 111a and 111b, which are the light source 110, to inform a user (Step 317).

Such processing makes it possible to inform a user of necessity for replacing the light source 110 at appropriate time by using the time-varying correction formulae.

Figure 12:
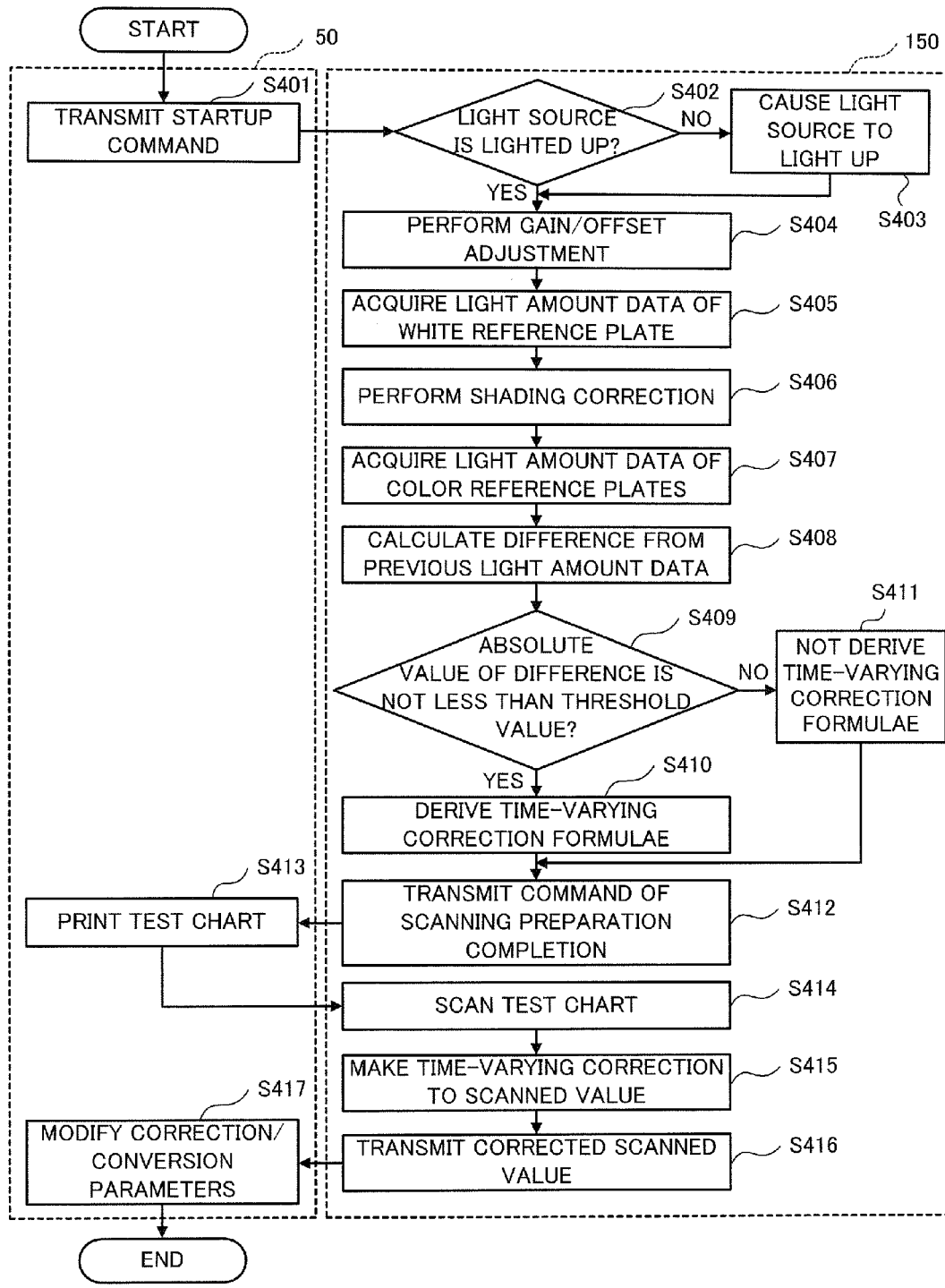
FIG. 12 is a flowchart illustrating a fourth example in which time-varying correction to a scanned value of the image scanner is made by using the time-varying correction formulae.

FIG. 12 is a flowchart illustrating a fourth example in which time-varying correction to a scanned value of the image scanner 100 is made by using the time-varying correction formulae.

Processing in Steps 401 to 407 is similar to that in Steps 101 to 107 described with FIG. 9.

In FIG. 12, after acquiring the light amount data by use of the color reference plates 127, the processing portion 150 obtains a difference between this light amount data and the light amount data acquired at the time of derivation of the previous time-varying correction formulae (Step 408). The processing portion 150 then determines whether or not the absolute value of this difference is not less than a predetermined threshold value (Step 409). If the absolute value of the difference is not less than the predetermined threshold value, the processing portion 150 derives time-varying correction formulae (Step 410). After that, processing in Steps 412 to 417 is carried out. The processing in Steps 412 to 417 is similar to that in Steps 109 to 114 described with FIG. 9.

Meanwhile, if the absolute value of the difference is less than the predetermined threshold value in Step 409, the processing portion 150 does not derive time-varying correction formulae (Step 411). That is, the processing portion 150 does not update the time-varying correction formulae, but uses the time-varying correction formulae previously derived. After that, processing in Steps 412 to 417 is carried out.

Such processing makes it possible to update the time-varying correction formulae as necessary. That is, the time-varying correction formulae may be updated only when there is statistical significance.

Figure 13:
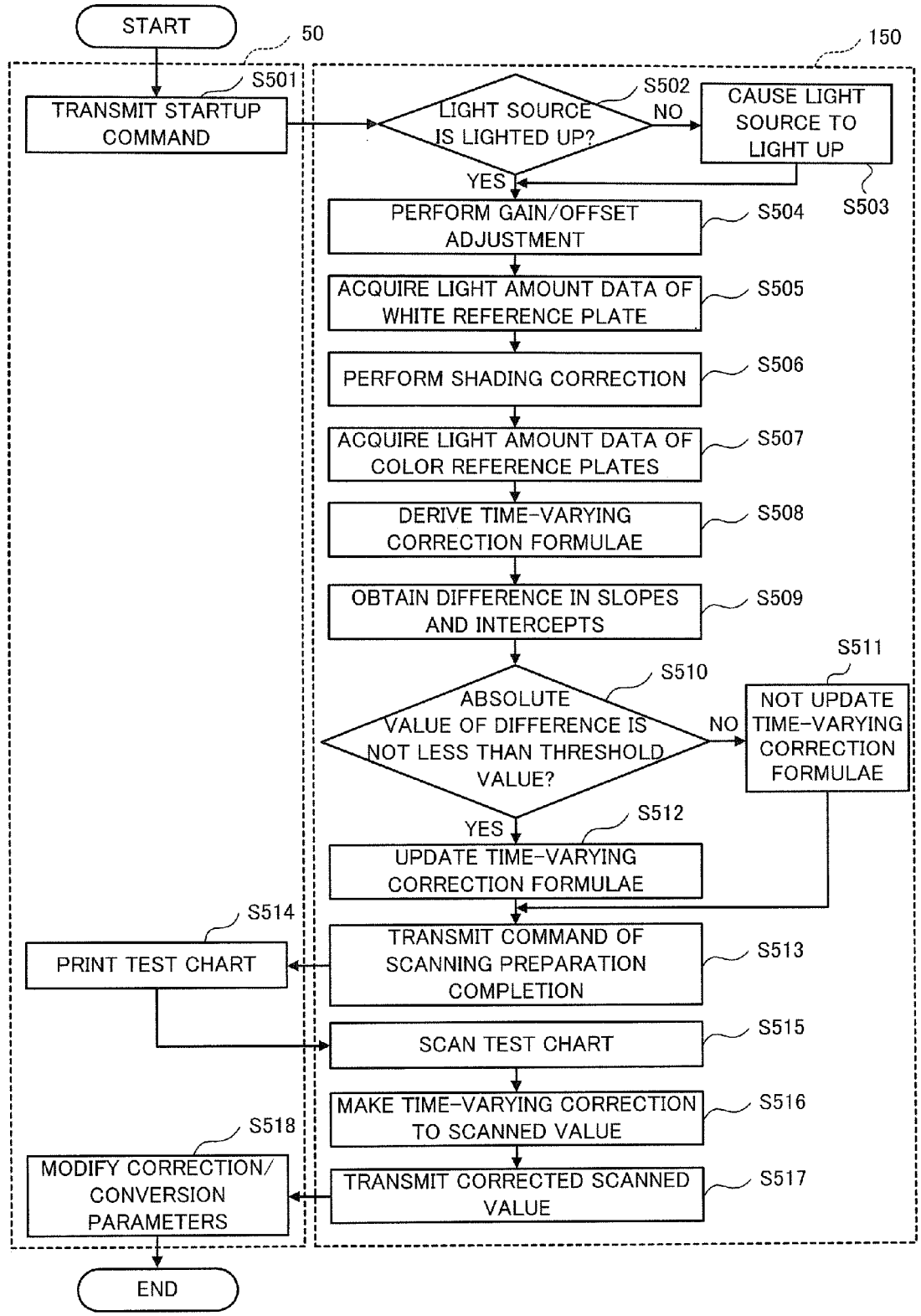
FIG. 13 is a flowchart illustrating a fifth example in which time-varying correction to a scanned value of the image scanner is made by using the time-varying correction formulae.

FIG. 13 is a flowchart illustrating a fifth example in which time-varying correction to a scanned value of the image scanner 100 is made by using the time-varying correction formulae.

Processing in Steps 501 to 508 is similar to that in Steps 101 to 108 described with FIG. 9.

In FIG. 13, after deriving the time-varying correction formulae, the processing portion 150 obtains a difference between the slopes (a) and the intercepts (b) of the newly derived time-varying correction formulae and those of the previously derived time-varying correction formulae (Step 509). The processing portion 150 then determines whether or not the absolute value of the difference is not less than a predetermined threshold value (Step 510). If the absolute value of the difference is not less than the predetermined threshold value, the processing portion 150 updates the time-varying correction formulae (Step 512). After that, processing in Steps 513 to 518 is carried out. The processing in Steps 513 to 518 is similar to that in Steps 109 to 114 described with FIG. 9.

Meanwhile, if the absolute value of the difference is less than the predetermined threshold value in Step 510, the processing portion 150 does not update the time-varying correction formulae (Step 511). That is, the processing portion 150 uses the time-varying correction formulae previously derived. After that, processing in Steps 513 to 518 is carried out.

Also in this case, the time-varying correction formulae may be updated as necessary.

Next, a specific usage of the above-described difference correction formula is described.

Figure 14:
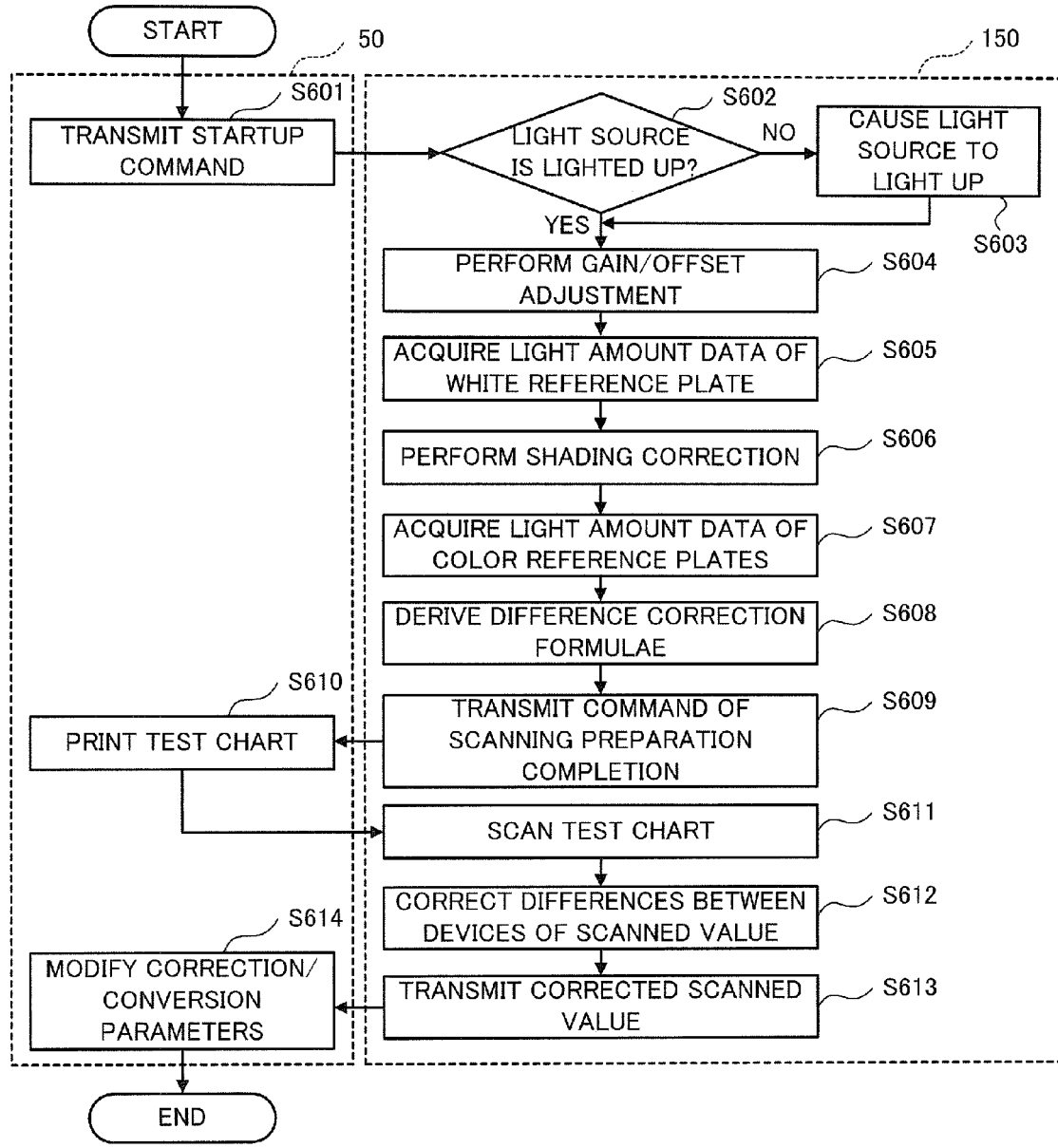
FIG. 14 is a flowchart illustrating an example in which a difference in a scanned value of the image scanner occurring due to differences between devices is corrected by using the difference correction formulae.

FIG. 14 is a flowchart illustrating an example in which a difference in a value scanned by the image scanner 100 occurring due to differences between devices is corrected by using the difference correction formulae.

Processing in Steps 601 to 607 is similar to that in Steps 101 to 107 described with FIG. 9.

In FIG. 14, after acquiring the light amount data by use of the color reference plates 127, the processing portion 150 derives difference correction formulae from the light amount data acquired by use of the white reference plate 125 and the color reference plates 127 (Step 608). After that, processing in Steps 609 to 614 is carried out. The processing in Steps 609 to 614 is almost similar to that in Steps 109 to 114 described with FIG. 9, but is different in that the processing portion 150 corrects differences between devices of the image scanner 100 for the scanned light amount data by using the difference correction formulae in Step 612.

Performing such processing before shipment of the image forming apparatus 1 suppresses differences between devices in a scanned value to be scanned by the image scanner 100, and thereby makes the scanned value accordant.

Note that the processing performed by the processing portion 150 in the above description may be performed by the main controller 50. That is, a series of processing may be performed by the main controller 50 without providing the processing portion 150.

The description has been given assuming that the image scanner 100 described above in detail is a device for adjusting the image forming units 11 of the image forming apparatus 1, but the image scanner 100 is not limited thereto. For example, the image scanner 100 may be applied to a scanning apparatus, such as a typical scanner that irradiates a sheet placed on a platen glass with light by using a light source and that scans reflected light by means of a CCD sensor or the like, the sheet having an image of a document or the like formed thereon.

Additionally, the description has been given assuming that the image scanner 100 described above in detail is applied to the image forming apparatus 1 forming an image by formation of a toner image, but the image scanner 100 is not limited thereto. For example, the image scanner 100 may be applied to an image forming apparatus that forms an image by an ink-jet system.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image scanner comprising:
   a light source that irradiates, with light, a recording medium on which an image is formed;
   a light receiving portion that receives light reflected by the recording medium;
   a generating portion that generates a light amount value from the light received by the light receiving portion;
   a measuring portion that is rotatable about a longitudinal axis thereof in which a plurality of reflecting surfaces are disposed, the reflecting surfaces respectively having predetermined colors different from each other, wherein at least one of the reflecting surfaces includes a plurality of color patches provided on a color reference plate and wherein at least one of the reflecting surfaces includes a white reference plate; and
   a processing portion that derives (1) a first correlation formula from a predetermined light amount value and from a light amount value generated when the white reference plate and the color reference plate are irradiated with the light from the light source, the correlation formula expressing differences between devices in scanning a light amount value; and (2) a second correlation formula using light amount data generated from a light amount value generated at a predetermined reference time and from a light amount value generated when the white reference plate and the color reference plate are irradiated with the light from the light source, the correlation formula expressing a time-varying change in the light source,
   wherein the color reference plate and white reference plate have reflectances different from each other.

2. The image scanner according to claim 1, wherein each of the predetermined light amount value and the generated light amount value is a light amount value at a time point when the light source is started to light up or to use by an end-user.

3. The image scanner according to claim 1, wherein the processing portion derives the correlation formula from a light amount value generated when both non-white color patches and white color patches in the plurality of reflected surfaces of the measuring portion are irradiated with light from the light source.

4. The image scanner according to claim 1, wherein the measuring portion includes a retraction surface.

5. The image scanner according to claim 4, wherein the measuring portion further comprises a plurality of measurement surfaces, and the retraction surface has a larger area than each of the plurality of measurement surfaces.

6. An image forming apparatus comprising:
   an image forming portion that forms an image on a recording medium;
   a scanner unit that scans the image on the recording medium in order to adjust an image to be formed on the recording medium by the image forming portion, the scanner unit including:

a light source that irradiates, with light, the recording medium on which the image is formed;

a light receiving portion that receives light reflected by the recording medium;

a generating portion that generates a light amount value from the light received by the light receiving portion; and a measuring portion that is rotatable about a longitudinal axis thereof in which a plurality of reflecting surfaces are disposed, the reflecting surfaces respectively having predetermined colors different from each other, wherein at least one of the reflecting surfaces includes a plurality of color patches provided on a color reference plate and wherein at least one of the reflecting surfaces includes a white reference plate; and a processing portion that derives (1) a first correlation formula from a predetermined light amount value and from a light amount value generated when the white reference plate and the color reference plate are irradiated with the light from the light source, the correlation formula expressing differences between devices in scanning a light amount value; and (2) a second correlation formula using light amount data generated from a light amount value generated at a predetermined reference time and from a light amount value generated when the white reference plate and the color reference plate are irradiated with the light from the light source, the correlation formula expressing a time-varying change in the light source, wherein the color reference plate and white reference plate have reflectances different from each other.

7. The image forming apparatus according to claim 6, wherein the image forming portion includes:

a toner image forming unit that forms a toner image;

a transfer unit that transfers, onto the recording medium, the toner image formed by the toner image forming unit; and a fixing unit that fixes, on the recording medium, the toner image transferred by the transfer unit.

8. The image forming apparatus according to claim 6, wherein the processing portion derives the correlation formula from a light amount value generated when both non-white color patches and white color patches in the plurality of reflected surfaces of the measuring portion are irradiated with light from the light source.

9. An image adjusting method of an image scanner including a light source irradiating, with light, a recording medium on which an image is formed and a light receiving portion receiving light reflected by the recording medium, the method comprising:

irradiating light onto a measuring portion that is rotatable about a longitudinal axis thereof, the measuring portion having a plurality of reflecting surfaces disposed thereupon, the reflecting surfaces respectively having predetermined colors different from each other, wherein at least one of the reflecting surfaces includes a plurality of color patches provided on a color reference plate and wherein at least one of the reflecting surfaces includes a white reference plate;

generating a light amount value from the light received by the light receiving portion; and deriving (1) a first correlation formula from a predetermined light amount value and from a light amount value generated when the white reference plate and the color reference plate are irradiated with the light from the light source, the correlation formula expressing differences between devices in scanning a light amount value; and (2) a second correlation formula using light amount data generated from a light amount value generated at a predetermined reference time and from a light amount value generated when the white reference plate and the color reference plate are irradiated with the light from the light source, the correlation formula expressing a time-varying change in the light source, wherein the color reference plate and white reference plates have reflectances different from each other.

10. The method according to claim 9, further comprising:

deriving the correlation formula from a light amount value generated when both non-white color patches and white color patches in the plurality of reflected surfaces of the measuring portion are irradiated with light from the light source.

* * * * *